C. P. SNYDER.
TRANSMISSION MECHANISM.
APPLICATION FILED DEC. 18, 1915.
1,196,820.
Patented Sept. 5, 1916.
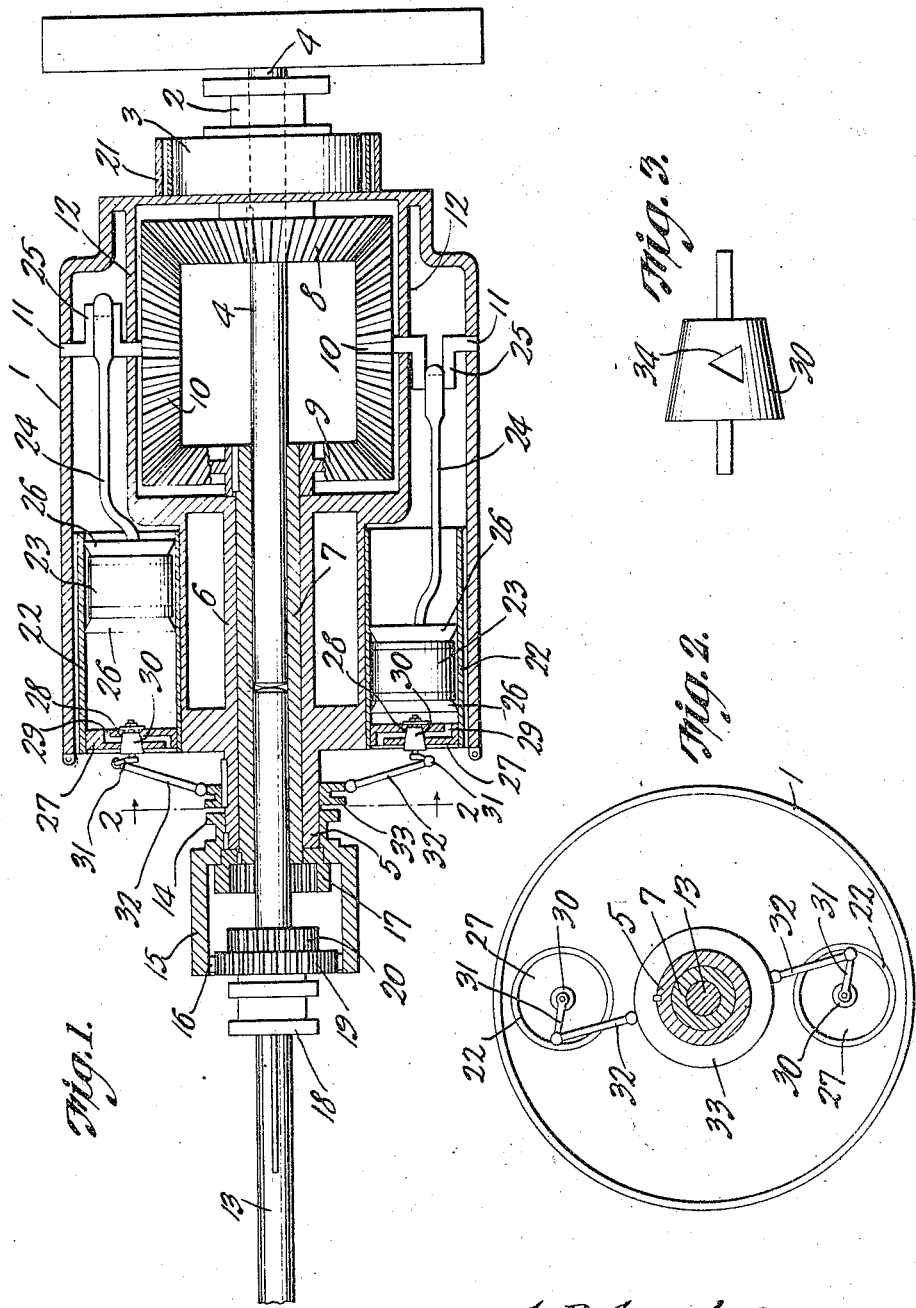
Witnesses
Inventor
C. P. Snyder
by
Attorneys

UNITED STATES PATENT OFFICE.

CHARLES P. SNYDER, OF MOUNT CARMEL, PENNSYLVANIA, ASSIGNOR OF THREE HUNDRED AND FORTY-THREE SIX-HUNDREDTHS TO HARRY A. BIRD, THOMAS J. CAMP, SIMON GEIST, MORRIS BLOOM, THOMAS H. TIDDY, H. OLIVER MOSER, AND PRESTON A. VOUGHT, ALL OF MOUNT CARMEL, PENNSYLVANIA.

TRANSMISSION MECHANISM.

1,196,820.  Specification of Letters Patent.  Patented Sept. 5, 1916.

Application filed December 18, 1915. Serial No. 67,553.

*To all whom it may concern:*

Be it known that I, CHARLES P. SNYDER, a citizen of the United States, residing at Mount Carmel, in the county of Northumberland and State of Pennsylvania, have invented a new and useful Transmission Mechanism, of which the following is a specification.

The present invention appertains to transmission mechanisms, and is particularly an improvement over the transmission gearing disclosed in my Patent No. 1,159,725 granted November 9, 1915.

It is the object of the invention to provide a transmission mechanism which is devoid of shifting gears, to avoid the stripping of gears and the kindred troubles, and the mechanism being controlled pneumatically or by a fluid, to vary the speed from neutral to high gear when the driven shaft rotates at the same velocity of the driving shaft, the pneumatic means also providing a cushion to absorb shocks and strains whereby the driving and driven elements or shafts can yield relatively to one another at any time when necessary.

The speed of the driven shaft is controlled through the medium of a throttle which regulates the flow of air or other fluid, whereby a nicety of adjustment is possible to provide for the various speeds.

It is also an object of the invention to provide a transmission mechanism of the nature indicated which is comparatively simple, compact and inexpensive in construction, and which will be thoroughly practical, reliable and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a longitudinal section of the mechanism, portions being shown in elevation. Fig. 2 is a cross section taken on the line 2—2 of Fig. 1. Fig. 3 is an enlarged elevation of one of the throttle valves.

In carrying out the invention, there is provided a rotatable casing 1 provided at one end with a centrally located journal 2 adapted to be journaled in a suitable supporting bearing (not shown), and the casing 1 has fixed thereto a brake drum 3 adjacent the journal 2. A longitudinal driving shaft connected to the engine or other prime mover (not shown) is journaled through said end of the casing concentric or coaxial therewith, and the other end of the casing has an outstanding central neck 5. The casing has a tubular portion 6 therein in alinement with the neck 5, and a tubular shaft 7 is journaled for rotation through the neck 5 and tubular portion 6. The inner end of the driving shaft 4 enters and is journaled for rotation within the tubular shaft 7.

A bevel gear 8 is keyed upon the shaft 4 adjacent the end of the casing 1 having the journal 2, and a similar gear 9 is keyed upon the inner end of the tubular shaft 7 opposite the gear 8. Meshing with both of the gears 8 and 9 is a pair of opposite bevel gears 10 secured upon the inner ends of radial shafts 11 journaled through the periphery of the casing 1 and partitions 12 with which the casing is provided therein. The gears 8, 9 and 10 are continually in mesh, and constitute the only gears of the transmission mechanism.

A driven shaft 13 is in alinement with the driving shaft 4 and has one end entering and journaled for rotation within the tubular shaft 7. A journal 14 is secured upon the end of the neck 5 and is adapted to be journaled for rotation in another suitable supporting bearing (not shown) whereby the casing 1 in having its journals 2 and 14 supported by suitable bearings, is capable of rotating about its axis. The neck 5 or journal 14 thereof is provided with an outstanding clutch member 15 surrounding the shaft 13 and provided at its free edge with an internal set of inwartdly projecting teeth 16. An interiorly toothed clutch member 17 is secured to the outer end of the tubular shaft 7 within the clutch member 15 and is spaced from the teeth 16, and a sleeve or collar 18 feathered or splined upon the shaft 13 is provided with toothed clutch members 19 and 20 engageable with the teeth 16 and clutch member 17, respectively. The clutch member 19 is of larger diameter than the clutch member 20, and the clutch member 20 is adapted to move into the clutch member 17. When the collar 18 is moved to an intermediate position, the parts are in neutral position, since the driven shaft 13 is disconnected both from the tubular shaft 7, and from the clutch member 15 attached to the casing. When the collar 18 is moved in one direction the clutch member 19 will be engaged with the teeth 16 of the clutch member 15, to connect the shaft 13 rigidly with the casing 1, and when the collar 18 is moved in the other direction the clutch member 20 will be moved within and engaged with the clutch member 17 to connect the shaft 13 rigidly with the tubular shaft 7.

The casing 1 can be held stationary or retarded by means of a brake band 21 surrounding the drum 3 and adapted to embrace the same, said brake band being operated in any suitable manner.

The pneumatic control of the mechanism includes a pair of diametrically opposite cylinders 22 secured within the casing 1 and arranged longitudinally and parallel with the shafts. A piston 23 is slidable within each cylinder, and is connected by a connecting rod 24 with a crank 25 with which the corresponding shaft 11 is provided, whereby when the gears 10 are rotated relative to the casing 1, the cranks 25 are rotated for reciprocating the pistons 23. Said pistons are preferably provided with leather packing cups 26 upon the faces or ends thereof to prevent leakage.

The inner ends of the cylinders 22 are open, while the outer ends are closed by heads or plugs 27 secured therein. Each head 27 is provided with a central bore 28, and with a passage or duct 29 intersecting said bore and communicating at one end with the interior of the cylinder and at its other end with the atmosphere. Rotatable throttle valves 30 are mounted for oscillation within the bores 28, and are provided at their outer ends with radial arms 31 which are connected by links 32 with a shifting collar 33 slidable or splined upon the neck 5 to rotate with the casing. The links 32 are connected by universal or ball and socket joints with the arms 31 and collar 33, and the arms 31 are so arranged, that when the collar 33 is shifted outwardly, the links 32 move the arms 31 inwardly to open the valves 30, and when the collar 33 is shifted inwardly, the arms 31 are swung outwardly for closing the valves 30. Each valve 30 has a passage 34 which is of triangular form, as seen in Fig. 3, thereby when the valve is swung to bring the passage 34 into communication with the passage 29, the smaller end of the passage 34 is first started into registration with the passage 29 to provide a restricted flow of air, and when the valve 30 is swung farther, the flow of air through the valve is accelerated, thus providing a nicety of adjustment.

Any suitable number of cylinders 22 and accompanying parts can be employed, as may be found most satisfactory under the circumstances.

In operation, to disconnect the shaft 13 from the driving shaft 4, the collar 18 is shifted to neutral position to disconnect the shaft 13 from the casing 1 and tubular shaft 7, and the collar 33 is also shifted to swing the valves 30 to open position, whereby air can flow readily through the passages 29 into and out of the cylinders as the pistons reciprocate. Then, as the driving shaft 4 rotates, to rotate the gear 8, the casing 1 can rotate freely if the gears 10 are carried around the shaft 4, and the gears 10 can also rotate freely about their axes to rotate the gear 9 and shaft 7, and to reciprocate the pistons 23. This provides a "double" neutral, since even if the valves 30 are closed, to impede the rotation of the gears 10 relative to the casing, the casing can rotate freely, and if the collar 18 is shifted to engage either of the clutch members 15 or 17, with the valves 30 open, the gears 10 can rotate freely relative to the casing without the shaft 13 being rotated. To rotate the shaft 13 in a forward direction, or in the same direction as the shaft 4, the collar 18 is shifted to bring the clutch member 19 into engagement with the clutch member 15, whereby the shaft 13 is connected rigidly with the casing 1. Now, the gear 8 in rotating will rotate the gears 10 about their axes, thus rotating the cranks 25 and reciprocating the pistons 23. As long as air is free to flow into and out of the cylinders, the pistons can reciprocate without difficulty, and to start the rotation of the shaft 13, the collar 33 is shifted to swing the valves 30 closed. When the valves 30 are completely closed, the flow of air into and out of the cylinders is shut off, and this provides closed air chambers between the pistons 23 and heads 27, preventing the reciprocation of the pistons, and thus preventing the rotation of the gears 10 relative to the casing. As a result, the gears 10 will be moved around the shaft 4 with the gear 8, thus rotating the casing 1, and rotating the shaft 13 with the casing at the same velocity as the shaft 4. In this case, there are no relatively rotating parts, since all parts rotate as a unit, it being possible, however, for the pistons 23 to move slightly within the cylinders to permit of a yielding action between the driving and driven shafts, due to the provision of the air cushions within the cylinders. This serves to absorb shocks and it is desirable for other obvious reasons. When the valves 30 are only partially closed, to allow a restricted flow of air into and out of the cylinders, the movement of the pistons 23 is only partially impeded, thus allowing the gears 10 to rotate slowly relative to the casing, thereby allowing the casing 1 to rotate slower than the shaft 4, and also rotating the shaft 13 at a slower velocity. By controlling the position of the throttle valves 30 to regulate the flow of air or fluid, the speed of the driven shaft can be controlled to a nicety, and any speed can be obtained between neutral and high gear. In the high gear, the shaft 13 is rotated with and at the same velocity as the shaft 4.

To obtain a reverse speed of the driven shaft 13, the collar 18 is shifted to bring the clutch member 20 into engagement with the clutch member 17, whereby the shaft 13 is connected rigidly with the tubular shaft 7, but as long as the casing rotates, the shaft 13 will be passive, since the gear 9 need not rotate. Thus, the gear 8 in being rotated will rotate the gears 10 about their own axes and about the axis of the shaft 4, the pistons 23 being free to reciprocate. By impeding or slowing up the rotation of the casing 1, the shaft 7 will be rotated. Thus, by applying the brake band 21 to the drum 3, to retard the rotation of the casing 1, the gears 10 cannot now rotate as easily about the shaft 2 as before, and this will result in the gears 10 rotating the gear 9 to actuate the shaft 7 and the driven shaft 13 which is connected to the shaft 7. In this case, the gear 9 is rotated in the direction reverse to the direction of rotation of the gear 8, due to the intervention of the gears 10 between the gears 8 and 9, and the shaft 13 is therefore rotated in a direction reverse to the shaft 4.

The collars 18 and 33 are grooved for the connection of a suitable operating device, whereby said collars can be shifted manually.

The air throttle provides effective means for controlling the speed, and it will be noted that in all speeds forward, it is possible for the driving and driven shafts to yield relative to one another for absorbing shocks and strains. This relieves the engine, tires, gears and other parts of unnecessary strains and jars, and also provides for the smooth operation of the machine. With the present mechanism, the ordinary clutch between the engine and driving shaft need not be used, since the present mechanism is operable for quickly and effectively disconnecting the driving and driven shafts. The gears of the present mechanism are continually in mesh, and there are no shifting gears, springs or other objectionable features as exist in shift gear transmission mechanisms. The present transmission mechanism is adapted especially for use in automobiles, but can be used in water crafts, factories, and elsewhere to provide a variable speed connection between a driving and a driven shaft. When the mechanism is used in an automobile, it is possible to set the mechanism to "reverse" when the machine is traveling down grade, to thereby provide means for retarding the motion of the machine, and without danger to the machine, due to the provision of the air cushions.

Having thus described the invention, what is claimed as new is:

1. A transmission mechanism comprising a rotatable casing, a driving shaft coaxial therewith, a driven shaft, a third shaft coaxial with the casing, bevel gears keyed to the driving and third shafts, a bevel gear carried for rotation about a radial axis by the casing and meshing with the aforesaid gears, means for connecting the driven shaft with either the casing or the third shaft, means for impeding the rotation of the gear carried by the casing relative to the casing, and means for impeding the rotation of the casing.

2. A transmission mechanism embodying a rotatable casing, a tubular shaft journaled through one end thereof, a driving shaft journaled through the other end thereof and entering said tubular shaft, a driven shaft entering said tubular shaft, bevel gears keyed to the driving and tubular shafts within the casing, a third bevel gear carried for rotation about a radial axis by the casing and meshing with the aforesaid gears, clutch members carried by the outer end of said tubular shaft and the corresponding end of the casing, clutch means slidable upon the driven shaft between and engageable with the aforesaid clutch members, means for impeding the rotation of the third gear relative to the casing, and means for impeding the rotation of the casing.

3. A transmission mechanism embodying a rotatable casing having a cylinder provided with a head, a driving shaft coaxial with the casing, a driven shaft, a third shaft coaxial with the casing, means for connecting the driven shaft with either the casing or third shaft, bevel gears keyed to the driving and third shafts, a bevel gear carried for rotation about a radial axis by the casing and meshing with the aforesaid gears, a piston working in said cylinder and connected to the third gear to be reciprocated thereby, said cylinder having a passage for the inlet and outlet of fluid, a valve controlling said passage, means for adjusting said valve, and means for impeding the rotation of the casing.

4. A transmission mechanism embodying a rotatable casing having a longitudinal cylinder at one side of its axis and provided with a head at its outer end, said head having a fluid passage, a valve journaled in said head to control said passage and having a radial arm, the casing having a neck at one end, a collar slidable upon said neck, a link connecting said collar and arm, a tubular shaft journaled through said neck and having a clutch member at its outer end, a driving shaft journaled through the other end of the casing and entering said tubular shaft, bevel gears keyed to said driving and tubular shafts, a radial shaft carried by the casing having a crank, a bevel gear secured to the radial shaft and meshing with the aforesaid gears, a piston working in the cylinder, a connecting rod connecting said piston and crank, means for impeding the rotation of the casing, a clutch member carried by said neck, a driven shaft entering said tubular shaft, and clutch means slidable upon the driven shaft between the aforesaid clutch members and engageable therewith.

In testimony that I claim the foregoing as my own, I have hereto affixed my signature in the presence of two witnesses.

CHARLES P. SNYDER.

Witnesses:
  WALTER S. SHIPMAN,
  JEFFERSON SHIPMAN.